United States Patent [19]

Boggs

[11] 4,050,809
[45] Sept. 27, 1977

[54] COMPACT VISUALIZER

[76] Inventor: William O. Boggs, 1333 N. Robberson, Springfield, Mo. 65802

[21] Appl. No.: 708,888

[22] Filed: July 26, 1976

[51] Int. Cl.² .................................... G03B 21/26
[52] U.S. Cl. .................................... 353/35; 40/86 A
[58] Field of Search .............. 353/35, 30; 35/28, 76; 40/93, 94, 95, 86 A; 242/56.9, 67.1, 67.4

[56] References Cited

U.S. PATENT DOCUMENTS

| | | | |
|---|---|---|---|
| 149,809 | 4/1974 | Taylor | 40/94 |
| 225,130 | 3/1880 | Herbert et al. | 40/94 |
| 1,090,502 | 3/1914 | Robinson | 40/93 |
| 2,647,435 | 8/1953 | Nemeth | 242/201 |
| 2,813,457 | 11/1957 | Fitzgerald | 353/35 |
| 3,975,094 | 8/1976 | Boggs | 353/35 |

Primary Examiner—Harry N. Haroian
Attorney, Agent, or Firm—Gravely, Lieder & Woodruff

[57] ABSTRACT

A visualizer has a case containing spools arranged in sets of two. A different film strip is wound around the two spools of each set and the portion of the film strip located intermediate the two spools passes through a gate where all the film strips are superimposed. Each spool has a pinion gear which is normally located adjacent to a large drive gear rotated by a hand crank on the case. An actuating mechanism brings the pinion gear of either spool for a set into engagement with the drive gear, causing the spool to rotate and advance the film strip of that set through the gate, the direction of advancement being dependent on which of the spools is engaged with the spur gear. Hence, it is possible to change the composition of the composite illustration formed by the superimposed film strips.

11 Claims, 11 Drawing Figures

COMPACT VISUALIZER

BACKGROUND OF THE INVENTION

This invention relates in general to visualizers and more particularly to a visualizer which composes composite illustrations.

Heretofore, machines have been developed for composing composite illustrations from superimposed films, or more specifically, from superimposed frames on such films. The composition of these composite illustrations may be altered by moving the films to bring different frames thereof into alignment. Normally, each film is wound around two spools and the portion in between is superimposed on other film strips to create the composite illustration. Each spool normally has a knob by which it is turned. As a result a multitude of knobs must be turned and this is extremely cumbersome. Moreover, most machines of this type have been quite heavy and bulky and certainly not suitable for use as a child's toy.

SUMMARY OF THE INVENTION

One of the principal objects of the present invention is to provide a visualizer in which composite illustrations may be formed from superimposed film strips. Another object is to provide a visualizer of the type stated in which the individual film strips thereof are advanced by turning a single knob. A further object is to provide a visualizer of the type states which is ideally suited for use as a child's toy. These and other objects and advantages will become apparent hereinafter.

The present invention is embodied in a visualizer having a gate and first and second spools located beyond the ends of the gate. A film strip is wound around those spools and passes through the gate. A rotatable drive member is in the case and actuating means move the spools into engagement with the drive member to rotate the spools and thereby advance the film strips. The invention also consists in the parts and in the arrangements and combinations of parts hereinafter described and claimed.

DESCRIPTION OF THE DRAWINGS

In the accompanying drawings which form part of the Specification and wherein like numerals and letters refer to like parts wherever they occur.

DETAILED DESCRIPTION

Figures 1, 2:
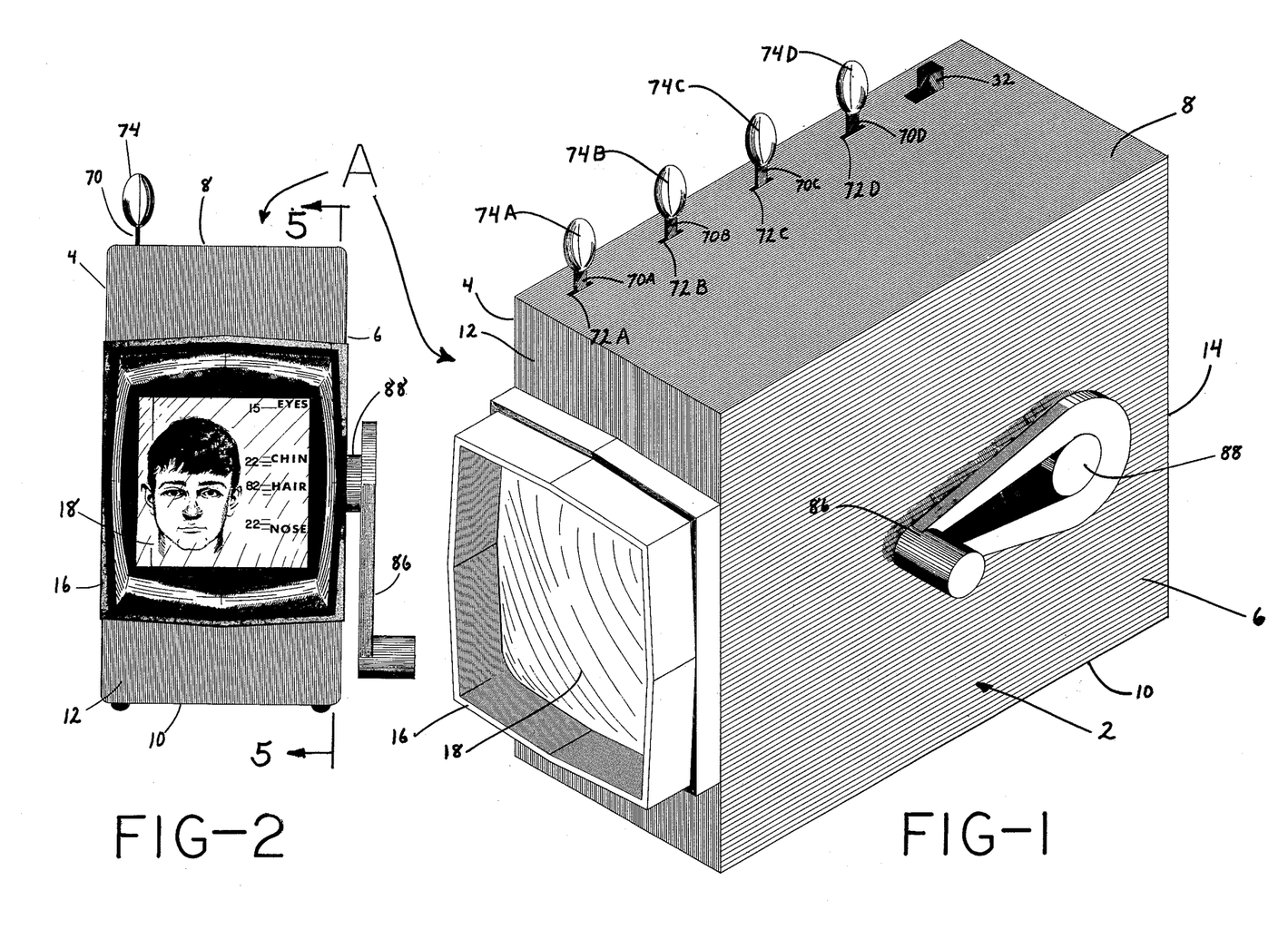
FIG. 1 is a perspective view of a visualizer constructed in accordance with and embodying the present invention.
FIG. 2 is a front elevational view of the visualizer showing a composite portrait formed by a plurality of superimposed film strips.

Referring now to the drawings (FIGS. 1 & 2) A designates a visualizer for composing composite illustrations. The visualizer is quite compact and light, and indeed is small enough to be hand held and operated by a child.

The visualizer A includes (FIGS. 1 & 2) a housing or case 2 of generally rectangular configuration, and this case has side walls 4 and 6, top and bottom walls 8 and 10, and front and rear walls 12 and 14. The side wall 6 is detachable from the walls 8, 10, 12, and 14 to provide access to the interior of the case 2. The front wall contains a frame 16 which carries a viewing lens 18.

The lens focuses on a gate 20 (FIGS. 3 & 4) located within the case 2 generally midway between the front and rear walls 12 and 14, and enlarges images appearing at the gate 20. The gate 20 is oriented parallel to the front and rear walls 12 and 14 and is defined by parallel front and rear plates 22 and 24. In other words, the vertical space between the plates 22 and 24 constitutes the gate 20. The front plate 22 is transparent, while the rear plate 24 is translucent. Moreover, the rear plate 24 is movable toward and away from the front plate 22, it being urged toward the front plate 22 by springs 26 on each side of it.

Located behind the rear plate 24 within the case 2 is a bulb 28 (FIG. 3) which is energized by a battery pack 30 (FIG. 4), and the circuit in which the two exist is controlled by a switch 32 located on the top wall 8. When the switch 32 is closed, the bulb 28 illuminates the translucent rear plate 24, and the illumination is visible through the transparent front plate 22 and the lens 18.

Figure 3:
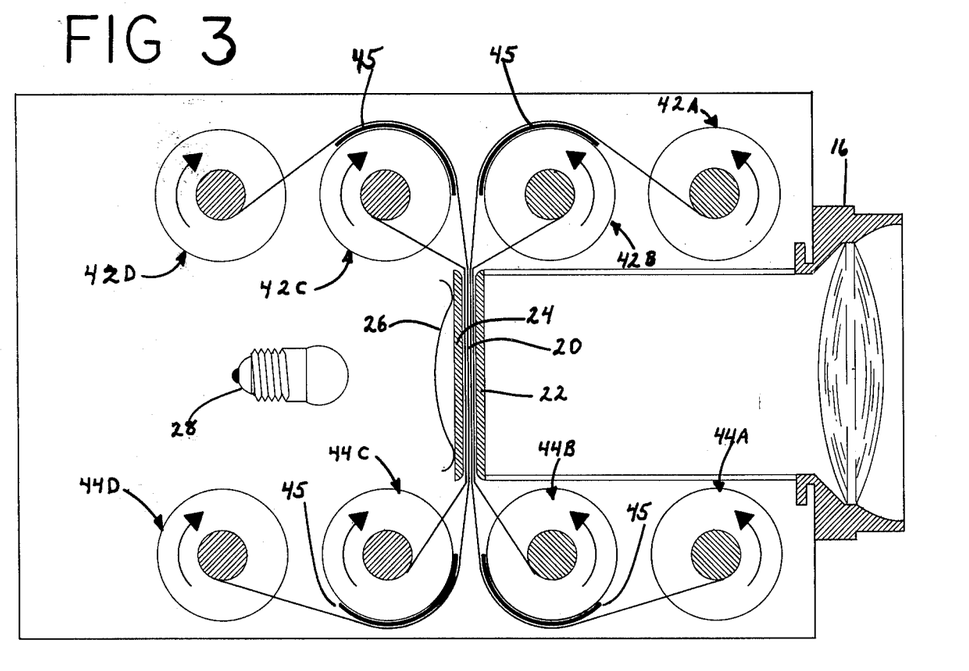
FIG. 3 is a longitudinal sectional view showing the film strips and the spools about which they are wound.

Extended through the gate 20 are four film strips 40a, 40b, 40c and 40d (FIG. 3). Within the gate 20 the film strips 40 are superimposed upon one another, but beyond the gate 20 each is wound around a separate upper spool 42 and a separate lower spool 44. Thus, the film strip 40a beyond the upper end of the gate 20 is wound around the upper spool 42a and beyond the lower end of the gate 20 is wound around a lower spool 44a. The film strip 40b, on the other hand, at its upper end is wound around spool 42b and at its lower end is wound around the spool 44b. The film strip 40c is wound around spools 42c and 44c, while the film strip 40d is wound around spools 42d and 44d. The spools 42a, b and 44a, b are located ahead of the gate 20, while the spools 42c, d and 44c, d are located behind the gate 20. Thus, upon leaving either end of the gate 20, the film strips 40a, b turn forwardly toward the front wall 12, while the film strips 40c, d turn rearwardly toward the rear wall 14. The film strip 40a passes over arcuate guides 45 located at the spools 42b and 44b and these guides prevent the film strips 40a and 40b from coming against each other prior to the gate 20. Likewise, the spools 42c and 44c are shrouded with more guides 45 over which the film strips 40d pass.

All the spools 42 and 44 are identical and each includes (FIG. 4) a core 46 with flanges 48 and 50 at the ends of the core 46. The film strip 40 is wound around the core 46 and the spacing between the flanges 48 and 50 is slightly greater than the width of the film strip 40 so that the film strip 40 fits between and is guided by them. Projecting from the flanges 48 and 50 on each spool 42 or 44 are spindles 52. The spindle 52 extend from the flange 50 is encircled by a pinion gear 54 (FIG. 5) which is fixed firmly in position with respect to the core 46 so that it always rotates with the spool 42 or 44.

The spindles 52 of each spool 42 or 44 are received in swing arms 56 (FIGS. 4 & 5) and the two swing arms 56 for each spool 42 or 44 roject generally horizontally and rearwardly beyond the flanges 48 and 50 where the two swing arms 56 are connected by an axle 58. The ends of the axle 58, moreover, project into and are confined by the side walls 4 and 6 of the case 2. Thus, the swing arms 56 are capable of pivoting about the axis of the axle 58, and when they do, the spool 42 or 44 carried by those swing arms 56 moves upwardly and downwardly in the case 2.

Figure 4:
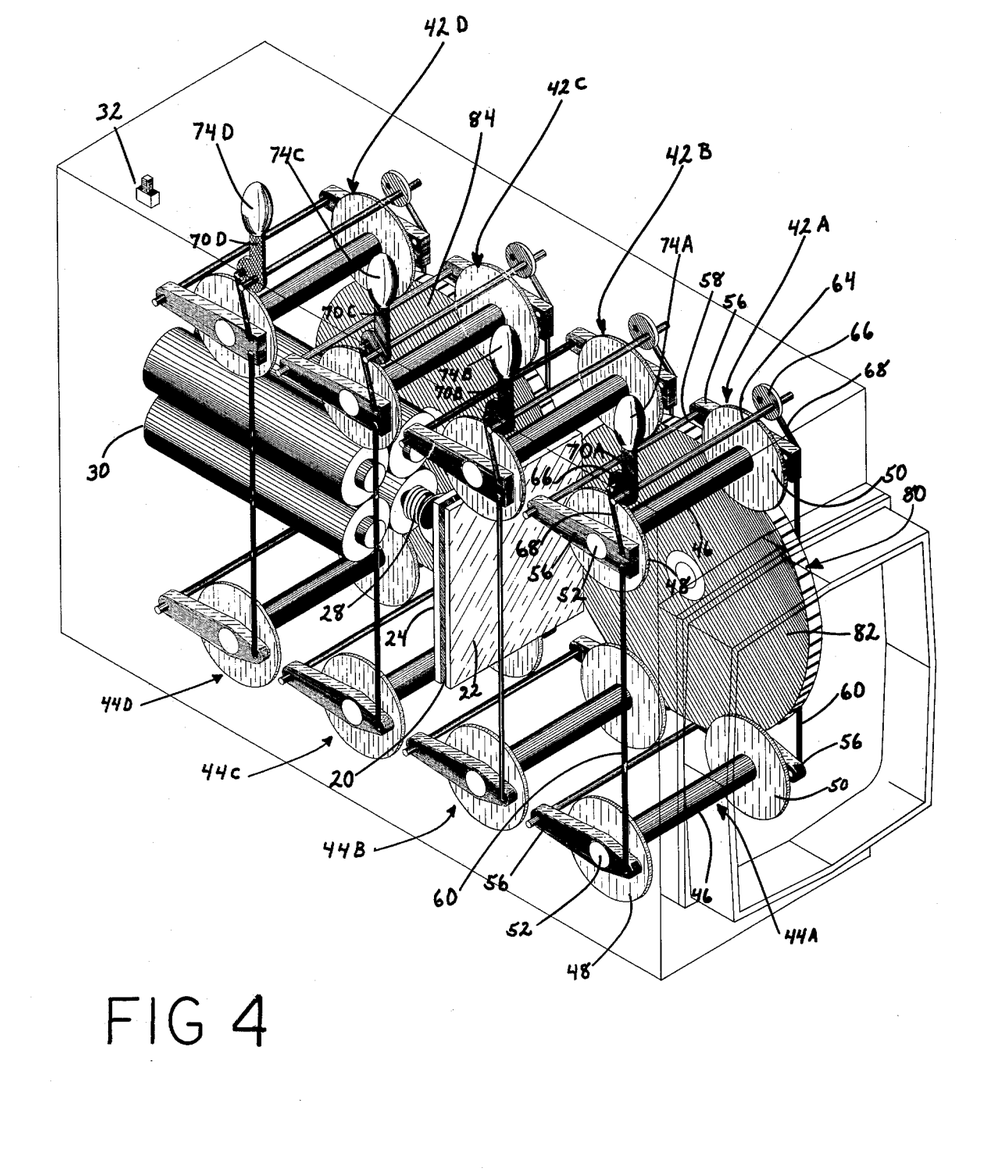
FIG. 4 is a perspective view showing many of the interior components of the visualizer including the spools, the large spur gears, the gate, the battery pack and bulb, and the actuators for moving the spools into and out of engagement with the spur gear.
Figure 5:
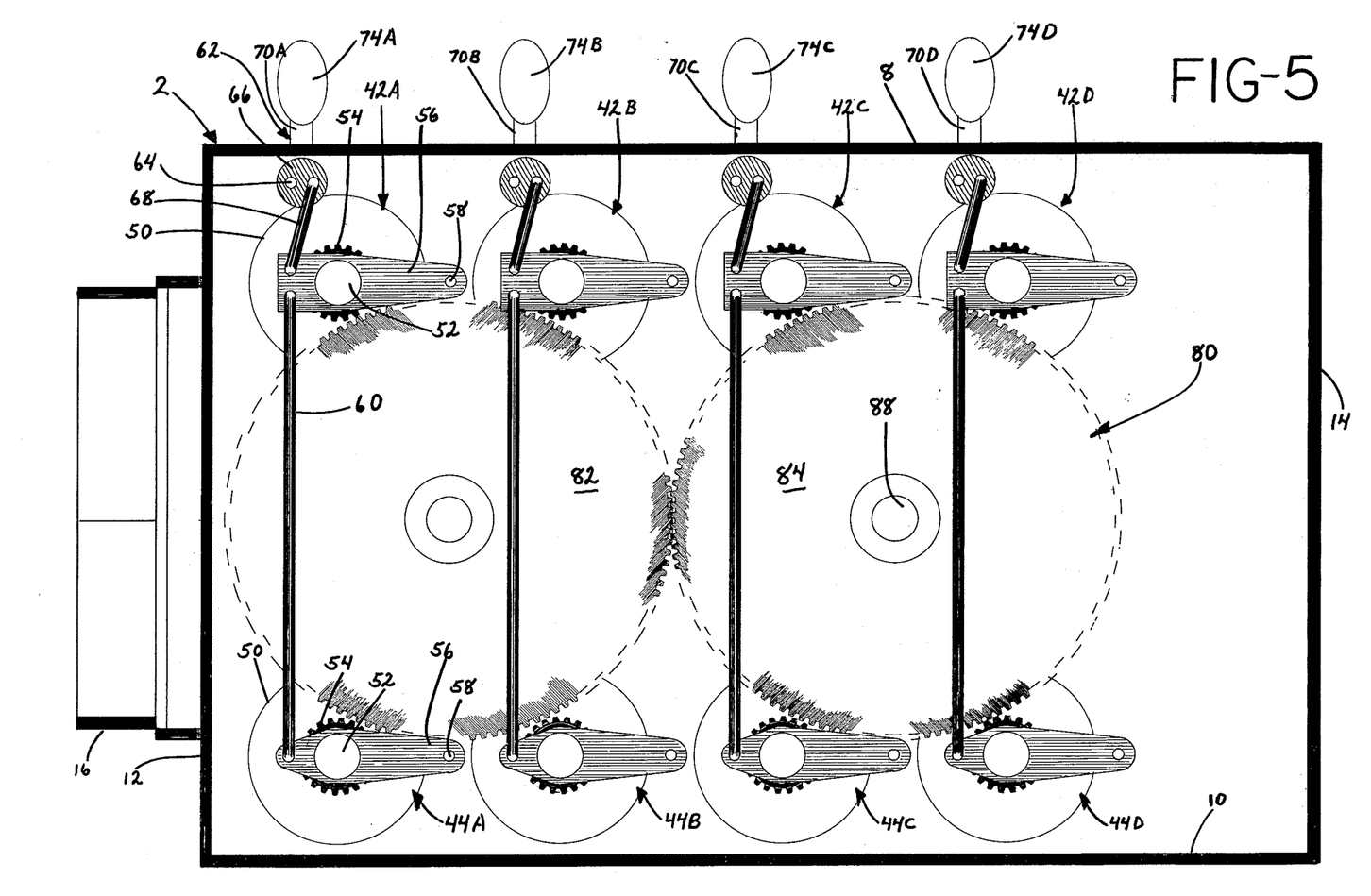
FIG. 5 is a longitudinal sectional view taken along line 5—5 of FIG. 2.

The swing arms 56 are located adjacent to the side walls 4 and 6 of the case 2, and the swing arms 56 for corresponding upper and lower spools 42 and 44 are connected by tie rods 60 (FIGS. 4 & 5). Two of the rods 60 exist for each set of upper and lower spools 42 and 44 with the one extending through the case 2 adjacent to the side wall 4 and connecting the swing arms 56 at that side wall and the other extending through the case 2 adjacent to the side wall 6 and connecting the swing arms 56 at that side wall. The tie rods 60 enable the upper and lower spools 42 and 44 of each set to move upwardly and downwardly in unison. This movement is provided by an actuator 62, there being a separate actuator 62 for each set of upper and lower spools 42 and 44.

Each actuator 62 includes (FIGS. 4 & 5) a cross shaft 64 which extends through the case 2 above the upper spool 42 and has its end fitted into the side walls 4 and 6 such that the shaft 64 is free to rotate in the case 2. Above each upper swing arm 56 the shaft 64 if fitted with a disk 66, and these disks are attached firmly to the shaft 64 so that they will rotate or otherwise move with the shaft 64. Each disk 66 in turn is connected by a short link 68 to the upper swing arm 56 directly beneath it, with the links 68 on each side being of equal length. The links 68 attach to the swing arms 56 ahead of the spindles 52 and attach to the disks 66 to the rear of the cross shaft 64. Thus, when the cross shaft 64 is turned in one direction, the disks 66 will pull the short links upwardly and elevate the upper and lower spools 42 and 44. However, when the cross shaft 64 is rotated in the opposite direction, the disks 66 push the links 68 downwardly and depress the spools 42 and 44. The disk 66 closest to the side wall 4 has an operating lever 70 projected from it, and this lever extends upwardly through a slot 72 in the top wall 8, beyond which it is provided with an actuating knob 74. Thus, four actuating levers 70a, b, c, and d exist along the top wall 8, one for each set of upper and lower spools 42 and 44. When a knob 74 is pushed rearwardly the spools 42 and 44 associated with it are driven downwardly, whereas when the knob 74 is pulled forwardly the spools 42 and 44 are lifted upwardly.

Figure 6:
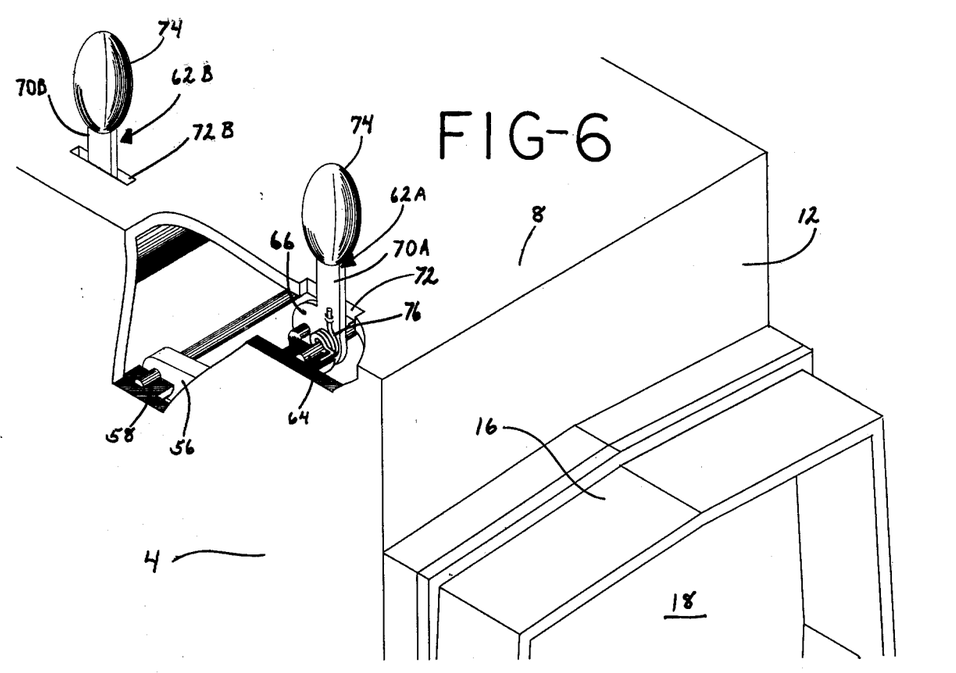
FIG. 6 is a fragmentary perspective view, partially broken away and in section and showing one of the actuators for moving the spools associated therewith into and out of engagement with a spur gear.

Each set of spools 42 and 44 is maintained in a neutral position by a spiral spring 76 (FIG. 6) which is wrapped around cross shaft 64 for the spools 42 and 44 and has its ends secured to the disks 66 and side wall 4. Movement of the spools 42 and 44 either upwardly or downwardly out of the neutral position is resisted by the spring 76. As a result, the digital force applied at the knob 74 must overcome the force exerted by the spring 76 before the spools 42 and 44 will move upwardly or downwardly.

The spools 42 and 44 are driven by a drive mechanism 80 (FIGS. 4 & 5) to individually advance the film strips 40 through the gate 20. The drive mechanism 80 includes a pair of relativey large spur gears 82 and 84 (FIG. 5) which are of equal size and are located adjacent to the side wall 6 within the case 2. The front gear 82 furthermore aligns with the pinion gears 54 on the upper spools 52a, b and the pinion gears 54 on the lower spools 44a, b. Indeed, the gear 82 fits between the pinion gears 54 for the upper and lower spools 42a and 44a and also between the pinion gears 54 for the upper and lower spools 42b and 44b. However, when the spools 42a, b and 44a, b are in their neutral position, the pinion gears 54 on them are withdrawn from the spur gear 82 and the gear 82 will merely rotate past the pinion gears 54. When the set of spools 42a and 44a is moved downwardly by pushing the actuating knob 74a rearwardly, the pinion gear 54 on the upper spool 42a will engage the spur gear 82 so that the spur gear 82 will drive the upper spool 42a in the direction which causes that spool to draw the film strip 40 upwardly through the gate 20. Conversely, when the set of spools 42a and 44a is moved upwardly by pulling the knob 74a forwardly, the pinion gear 54 on the lower spool 44a engages the spur gear 82 and the spool 44a will move in the direction which causes the film strip 40a to be drawn downwardly through the gate and wound about the spool 44a. The set of spools 42b and 44b functions in an identical manner, only it is controlled by the knob 74b. The set of spools 42c and 44c is controlled by the knob 74c, and the pinion gears 54 of that set engage the rear spur gear 84. The set of spools 42d and 44d, which is controlled by the knob 74d, functions in a similar manner. Thus, each of the film strips 40 may be moved individually by pushing or pulling the appropriate actuating knob 74 and rotating the spur gears 82 and 84. The latter motion is generated through a hand crank 86 (FIGS. 1 & 2) which is located beyond the side wall 6 and connects to the spur gear 84 through a short axle 88 located in the side wall 6.

Figures 7, 8, 9:
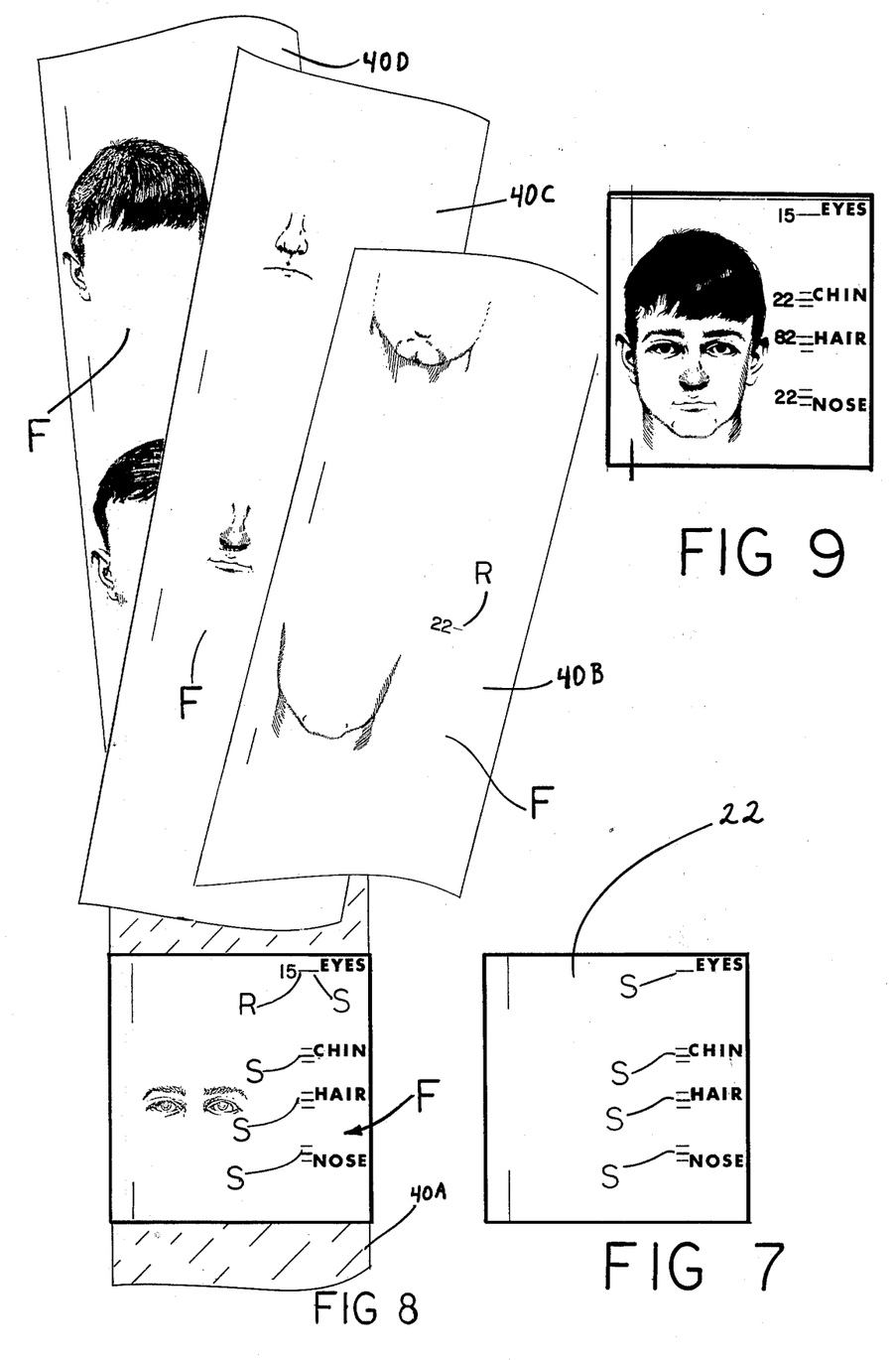
FIG. 7 is an elevational view of the front plate for the gate.
FIG. 8 is an elevational view showing several superimposed film strips which pass through the gate.
FIG. 9 is an elevational view of the front plate for the gate with a composite portrait formed behind that plate.

Each film strip 40 contains a multitude of frames F and usually all the frames F depict different variations of a common theme or feature (FIG. 8). For example, if the visualizer A is used to construct portraits, the film strip 40a may contain different variations of eyes and brows; the film strip 40b may contain different variations of head shapes and chins; the film strip 40c may contain different variations of noses and mouths; and the film strip 40d may contain different variations of ears and hair. Each frame F of a film strip 40 has a registration mark r (FIGS. 7 & 8) which aligns with an appropriate registration mark s on the front plate 22 of the gate 20. Consequently, different portraits may be composed merely by selecting the desired frames F from the four film strips 40 and bringing the registration marks of those frames into alignment with the appropriate marks on the front plate 22 (FIG. 9). A suitable registration system is disclosed in U.S. patent application Ser. No. 571,058 of William O. Boggs, filed Apr. 24, 1974 and entitled APPARATUS FOR COMPOSING COMPOSITE ILLUSTRATIONS.

OPERATION

To compose a composite illustration with the visualizer A, the user holds the visualizer A in his hands with the fingers of the left hand extending over the top wall 8 so that they may be used to manipulate the four actuating knobs 74. The right hand also grasps the case 2, but the thumb and one finger are free so as to be able to rotate the hand knob 86. The visualizer A is held at a position where the user may look through the lens 18 in the front wall and observe the front plate 22 as well as those frames F of the four film strips 40 which are located behind the front plate 22, that is within the confines of the gate 20. These frames F are illuminated by the bulb 28 which is located beyond the translucent rear plate 24. Assuming that the registration marks on the frames F are properly aligned with the appropriate registration marks on the front plate 22, then a composite illustration will be visible through the lens 18 (FIG. 9).

To change the composition of the illustration, one or more of the film strips 40 are moved. For example, to move the film strip 40a upwardly through the gate 20, the hand crank 86 is turned while the actuating knob 74a at the top wall 8 is pushed rearwardly to bring the pinion gear 54 of the upper spool 42a into engagement with the rotating spur gear 82. Accordingly, the rotation of the spur gear 82 is imparted to the upper spool 42a, and the film strip 40a is wound about it. Thus, the film strip 40a pays off of the lower spool 44a, which rotates freely within the case 2, and passes upwardly through the gate 20 and around the upper spool 42a. Conversely, when it is desired to move the film strip 40a in the opposite direction, the knob 74a is pulled forwardly. This elevates the lower spool 44a and brings its pinion gear 54 into engagement with the spur gear 82. The lower spool 44a rotates, causing it to pull the film strip 40a downwardly through the gate 20 and off of the upper spool 42a which merely revolves freely within the case 2. No change in the direction of the rotation for the hand crank 86 is required. The remaining sets of spools 42 and 44 operate in a similar manner, and are controlled by the appropriate actuating knobs 74.

Figures 10, 11:
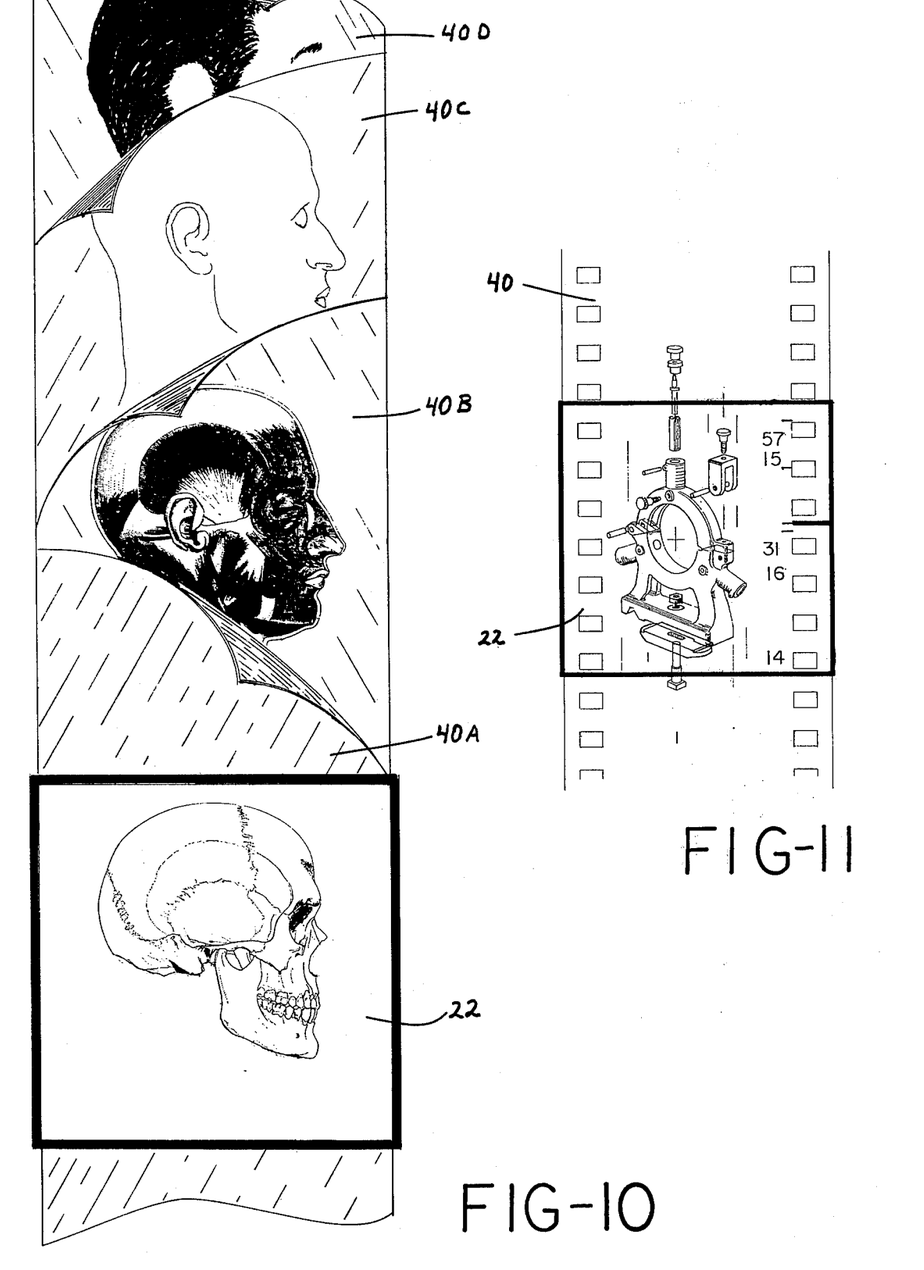
FIG. 10 is an elevational view of several superimposed film strips for forming a different type of illustration.
FIG. 11 is an elevational view of the front plate of the gate showing still another type of illustration which may be created.

The visualizer A may be used for purposes other than constructing portraits, the nature of the composite illustration being dependent on the film strips 40 which are in the case 2 (see FIGS. 10 & 11).

This invention is intended to cover all changes and modifications of the example of the invention herein chosen for purposes of the disclosure which do not constitute departures from the spirit and scope of the invention. What is claimed is:

1. A visualizer for composing composite illustrations, said visualizer comprising; a case; means defining a gate within the case; a first spool located beyond one end of the gate; a second spool located beyond the other end of the gate; a film strip connected to and wound around the first and second spools, the film strip passing through the gate intermediate the first and second spools; a rotatable drive member in the case; and actuating means for moving one or the other of the spools into engagement with the periphery of the drive member to rotate the spools, thereby causing the film strip to pass through the gate, the actuating means moving the first and second spools in unison such that when the first spool is moved into engagement with the periphery of the drive member, the second spool is moved away from the periphery of the drive member and vice-versa, the actuating means including first and second swing arms which pivot relative to the case and carry the first and second spools respectively, tie rods connecting the first and second swing arms to enable them to pivot in unison, and an actuating element for moving the swing arms.

2. A visualizer according to claim 1 wherein the drive means includes a spur gear and the first and second spools are provided with pinion gears which mesh with the spur gear when the first or second spool is moved into engagement with the drive member.

3. A visualizer according to claim 1 wherein the drive means includes a circular member which rotates in the case about an axis which passes through its center and is fixed with respect to the case.

4. A visualizer for composing composite illustrations, said visualizer comprising: a case; means defining a gate within the case; a first spool located beyond one end of the gate; a second spool located beyond the other end of the gate; a film strip connected to and wound around the first and second spools, the film strip passing through the gate intermediate the first and second spools; a rotatable drive member in the case; and actuating means for moving the spool into engagement with the periphery of the drive member to rotate the spools, thereby causing the film strip to pass through the gate, the actuating means moving the first and second spools in unison such that when the first spool is moved into engagement with the periphery of the drive member, the second spool is moved away from the periphery of the drive member and vice-versa, the actuating means including first and second swing arms which pivot relative to the case and carry the first and second spools respectively, and a lever which pivots relative to the case and is connected to the swing arms for moving the swing arms.

5. A visualizer according to claim 11 wherein the actuating element comprises a lever which pivots relative to the case and is connected to the swing arm.

6. A visualizer for composing composite illustrations, said visualizer comprising: a case; means defining a gate within the case; illuminating means for causing one side of the gate to be illustrated; viewing in the case for permitting observation of the other side of the gate; a plurality of first spools located in the case beyond one end of the gate and having parallel axes of rotation; a plurality of second spools located in the case beyond the other end of the gate and having parallel axes of rotation which are further parallel to the axes of rotation for the first spools, the second spools being equal in number to the first spools with each second spool corresponding to a different first spool, whereby sets of corresponding first and second spools are within the case; a separate film strip wound around each set of corresponding first and second spools, each film strip between its first and second spools passing through the gate where the film strips are superimposed on each other so as to produce a composite illustration which is visible at the viewing means; drive means in the case and having a drive surface which moves relative to the case; at least one swing arm in the case for each spool with the spool being mounted on the swing arm for rotation thereon, each swing arm being pivoted with respect to the case for swinging movement about a different pivot axis which is parallel to and offset from the axis of rotation from the spool, the arm of each spool being capable of moving the spool between a condition of engagement with the drive surface of the drive means, so that the drive means will rotate the spool, and a condition of disengagement with the drive means; means for maintaining the second spool of each set in its disengaged condition when the first spool of the set is in its engaged condition and vice-versa; and means for moving the swing arms for each set of corresponding first and second spools.

7. A visualizer according to claim 6 wherein the means for moving the swing arms includes a manually operable actuating element which is exposed at the exterior of the case.

8. A visualizer according to claim 6 and further comprising means for maintaining the spools of a set in a neutral condition wherein neither spool of the set is engaged with the drive means.

9. A visualizer according to claim 6 wherein each spool is mounted on a pair of swing arms.

10. A visualizer according to claim 6 wherein the means for maintaining the second spool of each set in its disengaged condition while the first spool is in its engaged condition and vice-versa connects the swing arms for the first and second spools of the set.

11. A visualizer according to claim 6 wherein the drive means comprises a pair of spur gears which are connected to rotate in unison and the spools have pinion gears which mesh with the spur gears when moved to the engaged condition, the first and second spools of one of the sets being engageable with one of the spur gears and the first and second spools of another of the sets being engageable with the other spur gear.

* * * * *

UNITED STATES PATENT AND TRADEMARK OFFICE
CERTIFICATE OF CORRECTION

PATENT NO. : 4,050,809
DATED : September 27, 1977
INVENTOR(S) : William O. Boggs It is certified that error appears in the above-identified patent and that said Letters Patent are hereby corrected as shown below:

Column 1, line 29, after "type" and before "which" change "states" to read - "stated".

Column 2, line 24, after "lens" insert the numeral "18".

Column 3, line 12, after "44" and before "generally" "roject" should read "project".

Column 3, line 39, after "64" and before "fitted" change "if" to read "is".

Column 4, line 11, after "spools" and before "and" change "52a, b" to read "42a, b".

Column 6, line 39, after "viewing" and before "in" insert the word "means".

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*